(12) United States Patent
Perschke et al.

(10) Patent No.: US 10,689,946 B2
(45) Date of Patent: Jun. 23, 2020

(54) DOWNHOLE CEMENT FLOW

(71) Applicant: Schlumberger Technology Corporation, Sugar Land, TX (US)

(72) Inventors: Malcolm Perschke, Spring, TX (US); James Hall, Spring, TX (US); Robert Olman, Washington, LA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/298,792

(22) Filed: Mar. 11, 2019

(65) Prior Publication Data

US 2019/0203560 A1    Jul. 4, 2019

Related U.S. Application Data

(62) Division of application No. 14/917,561, filed as application No. PCT/US2014/055139 on Sep. 11, 2014, now Pat. No. 10,227,843.

(60) Provisional application No. 61/876,646, filed on Sep. 11, 2013.

(51) Int. Cl.
| | |
|---|---|
| *E21B 33/14* | (2006.01) |
| *E21B 34/10* | (2006.01) |
| *G05B 19/416* | (2006.01) |
| *E21B 34/00* | (2006.01) |

(52) U.S. Cl.
CPC .............. *E21B 33/14* (2013.01); *E21B 34/10* (2013.01); *G05B 19/416* (2013.01); *E21B 2034/007* (2013.01); *G05B 2219/31376* (2013.01)

(58) Field of Classification Search
CPC .. E21B 33/14; E21B 2034/007; G05B 19/416
See application file for complete search history.

(56) References Cited

U.S. PATENT DOCUMENTS

| | | | |
|---|---|---|---|
| 4,176,717 A | * | 12/1979 | Hix ..................... E21B 34/14 166/154 |
| 4,436,151 A | | 3/1984 | Callihan et al. |
| 4,450,912 A | | 5/1984 | Callihan et al. |
| 2002/0088619 A1 | | 7/2002 | Follini et al. |
| 2002/0104656 A1 | | 8/2002 | Murley et al. |

OTHER PUBLICATIONS

PCT/US2014/055139, International Search Report and Written Opinion, dated Dec. 22, 2014, 12 pgs.

* cited by examiner

*Primary Examiner* — Amar Movva

(57) ABSTRACT

A method includes pumping cement to a bore of a shifting sleeve disposed in a ported component seated in a cased bore above a liner; flowing the cement from the bore of the shifting sleeve through radial passages of the shifting sleeve and radial passages of the ported component; and flowing the cement to an annulus between a casing of the cased bore and the liner.

19 Claims, 15 Drawing Sheets

DOWNHOLE CEMENT FLOW

RELATED APPLICATION

This application is a division of US Patent Application Publication No. 2016/0222756, filed Mar. 8, 2016, which is a national stage entry of International Patent Application No. PCT/US2014/55139, filed Sep. 11, 2014, which claims the benefit of and priority to U.S. Provisional Patent Application No. 61/876,646, filed Sep. 11, 2013, which is incorporated by reference herein.

BACKGROUND

Cementing can involve preparing and pumping cement into place in a bore. As an example, cementing operations may be undertaken to seal an annulus after a casing string has been run, to seal a lost circulation zone, to set a plug in an existing well from which to push off with directional tools, to plug a well so that it may be abandoned, etc. A cementing process may involve determining the volume of cement (e.g., optionally with reference to a caliper log) to be placed in a bore and, for example, physical properties of slurry and set cement (e.g., consider density, viscosity, etc.). A cementing crew may implement mixers and pumps to displace drilling fluids and place cement in a bore.

SUMMARY

According to one or more embodiments of the present disclosure, a method includes pumping cement to a bore of a shifting sleeve disposed in a ported component seated in a cased bore above a liner; flowing the cement from the bore of the shifting sleeve through radial passages of the shifting sleeve and radial passages of the ported component; and flowing the cement to an annulus between a casing of the cased bore and the liner.

According to one or more embodiments of the present disclosure, a method includes pumping cement to a bore of a shifting sleeve disposed in a ported component seated in a cased bore above a liner; translating a first dart to the bore of the shifting sleeve; flowing the cement from the bore of the shifting sleeve through radial passages of the shifting sleeve and radial passages of the ported component; flowing the cement to an annulus between a casing of the cased bore and the liner; translating a second dart to the bore of the shifting sleeve axially above the first dart; and shifting the shifting sleeve to a closed position. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, cement may be placed adjacent to a liner. As an example, a liner may be a string of casing in which the top does not extend to the surface but instead is suspended from inside another casing string. As an example, a liner hanger may be used to attach or hang one or more liners from an internal wall of another casing string.

As an example, a method may include operating one or more components of a liner hanger system. As an example, a lower completion may be a portion of a well that is at least in part in a production zone or an injection zone. As an example, a liner hanger system may be implemented to perform one or more operations associated with a lower completion, for example, including setting one or more components of a lower completion, etc. As an example, a liner hanger system may anchor one or more components of a lower completion to a production casing string.

Figure 1:
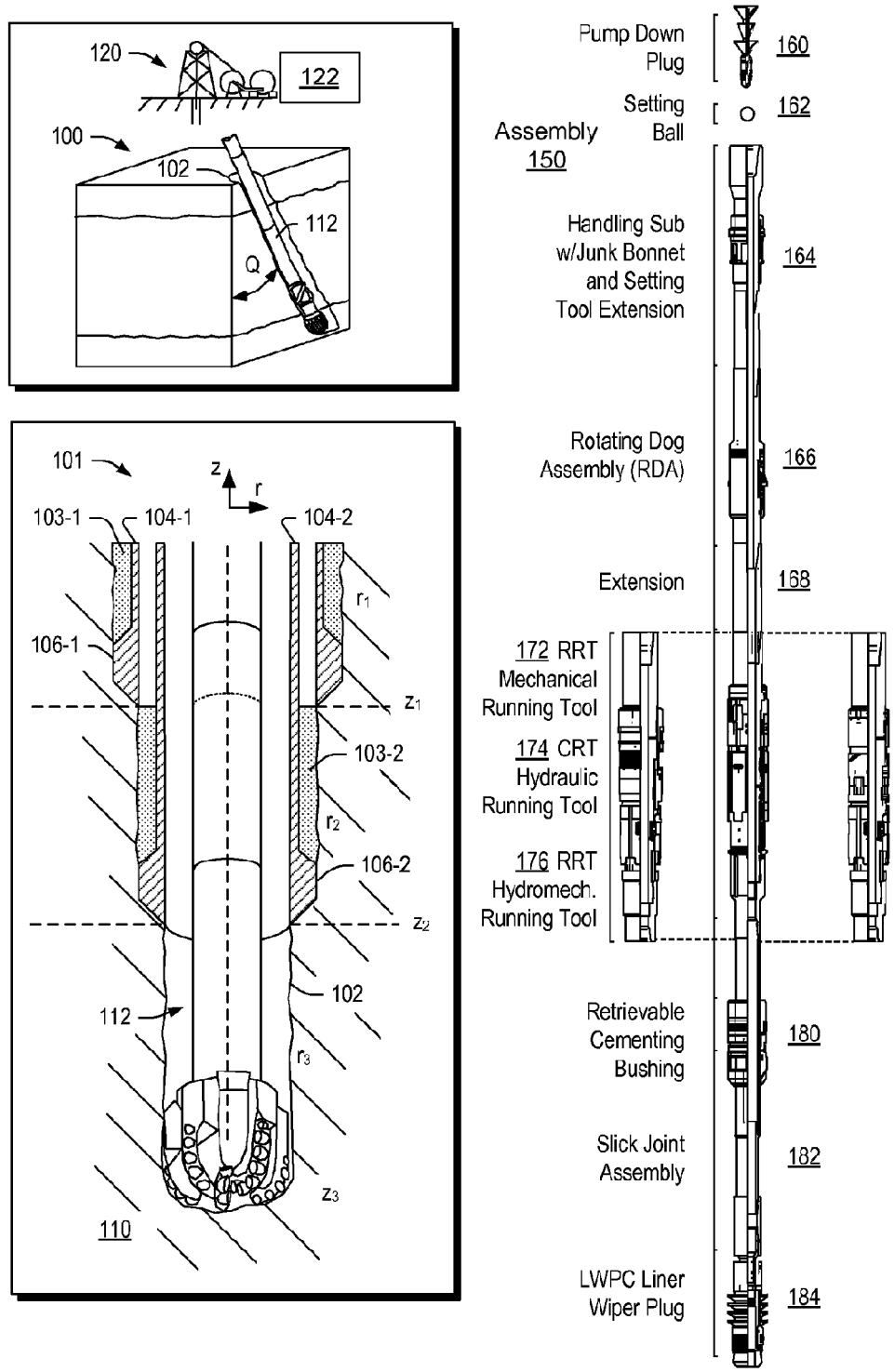
FIG. 1 illustrates examples of an environment, equipment and an assembly.
Figure 2:
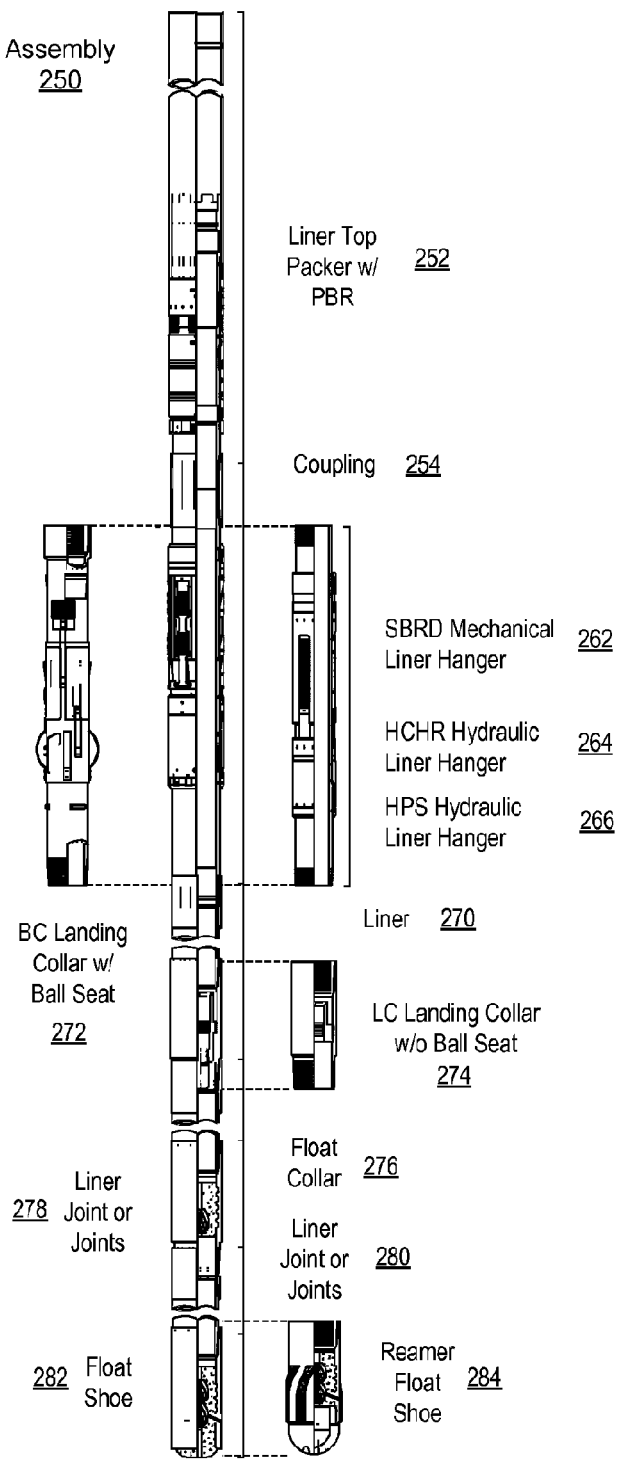
FIG. 2 illustrates an example of an assembly.

FIGS. 1 and 2 show an example of an environment 100, an example of a portion of a completion 101, an example of equipment 120 and examples of assemblies 150 and 250, which may be part of a liner hanger system. As an example, the equipment 120 may include a rig, a turntable, a pump, drilling equipment, pumping equipment, equipment for deploying an assembly, a part of an assembly, etc. As an example, the equipment 120 may include one or more controllers 122. As an example, a controller may include one or more processors, memory and instructions stored in memory that are executable by a processor, for example, to control one or more pieces of equipment (e.g., motors, pumps, sensors, etc.). As an example, the equipment 120 may be deployed at least in part at a well site and, optionally, in part at a remote site.

FIG. 1 shows an environment 100 that includes a subterranean formation into which a bore 102 extends where a tool 112 such as, for example, a drill string is disposed in the bore 102. As an example, the bore 102 may be defined in part by an angle ($\Theta$), noting that while the bore 102 is shown as being deviated, it may be vertical (e.g., or include one or more vertical sections along with one or more deviated sections). As shown in an enlarged view with respect to an r, z coordinate system (e.g., a cylindrical coordinate system), a portion of the bore 102 includes casings 104-1 and 104-2 having casing shoes 106-1 and 106-2. As shown, cement annuli 103-1 and 103-2 are disposed between the bore 102 and the casings 104-1 and 104-2. Cement such as the cement annuli 103-1 and 103-2 can support and protect casings such as the casings 104-1 and 104-2 and when cement is disposed throughout various portions of a wellbore such as the wellbore 102, cement may help achieve zonal isolation.

In the example of FIG. 1, the bore 102 has been drilled in sections or segments beginning with a large diameter section (see, e.g., $r_1$) followed by an intermediate diameter section (see, e.g., $r_2$) and a smaller diameter section (see, e.g., $r_3$). As an example, a large diameter section may be a surface casing section, which may be three or more feet in diameter and extend down several hundred feet to several thousand feet. A surface casing section may aim to prevent washout of loose unconsolidated formations. As to an intermediate casing section, it may aim to isolate and protect high pressure zones, guard against lost circulation zones, etc. As an example, intermediate casing may be set at about 6000 feet and extend lower with one or more intermediate casing portions of decreasing diameter (e.g., in a range from about thirteen to about five inches in diameter). A so-called production casing section may extend below an intermediate casing section and, upon completion, be the longest running section within a wellbore (e.g., a production casing section may be thousands of feet in length). As an example, production casing may be located in a target zone where the casing is perforated for flow of fluid into a bore of the casing.

Prior to introducing cement into an annulus between a bore and a casing, calculations may be performed to estimate an amount of cement sufficient to fill the annulus, for example, for purposes of sealing off a casing segment. Accuracy of an estimate as to the amount of cement as well as issues in a process of introducing cement may, for example, result in occasional voids or gaps (e.g., regions where cement is lacking).

As an example, a string may include one or more tools such as, for example, a logging while drilling (LWD) tool, which may carry one or more transmitters and one or more receivers. For example, the SONICSCOPE™ tool marketed by Schlumberger Ltd. (Houston, Tex.) carries a wideband multipole transmitter and wideband receivers. The multipole transmitter provides for transmission of high-frequency monopole energy (e.g., for compressional and shear slowness in fast formation), low-frequency monopole energy (e.g., for Stoneley waves) and quadrupole energy (e.g., for shear slowness in slow formations). The wideband receivers provide for digitization of sensed signals and inter-receiver sampling to address aliasing. As an example, a tool may include circuitry to sense information as to regions proximate to a bore. As an example, a tool may include circuitry to determine one or more cement-related parameters (e.g., extent of cement, cement quality, voids, etc.). As an example, a controller may include an interface to receive information from one or more sensors.

As mentioned, a liner may be a casing (e.g., a completion component). As mentioned, a liner may be installed via a liner hanger system. As an example, a liner hanger system may include various features such as, for example, one or more of the features of the assembly 150 and/or the assembly 250 of FIGS. 1 and 2.

As shown in FIG. 1, the assembly 150 can include a pump down plug 160, a setting ball 162, a handling sub with a junk bonnet and setting tool extension 164, a rotating dog assembly (RDA) 166, an extension(s) 168, a mechanical running tool 172, a hydraulic running tool 174, a hydromechanical running tool 176, a retrievable cementing bushing 180, a slick joint assembly 182 and/or a liner wiper plug 184.

As shown in FIG. 2, the assembly 250 can include a liner top packer with a polished bore receptacle (PBR) 252, a coupling(s) 254, a mechanical liner hanger 262, a hydraulic liner hanger 264, a hydraulic liner hanger 266, a liner(s) 270, a landing collar with a ball seat 272, a landing collar without a ball seat 274, a float collar 276, a liner joint or joints 278 and/or 280, a float shoe 282 and/or a reamer float shoe 284.

As an example, a method can include setting a liner hanger, releasing a running tool, cementing a liner and setting a liner top packer. As an example, a method can include pumping cement down a landing string and back up through an annulus. However, such an approach can exert force on a formation. For example, the mass of the cement and forces acting thereon may be transmitted to a formation, which, depending on its properties, may respond to the forces, possibly in a detrimental manner. As an example, an approach that pumps cement down and then back up through an annulus may stress a formation because heavy fluid (e.g., cement) is pumped upwards in a relatively tight annular area. In such an example, the back pressure imparted on a formation may be a function of the rate at which the heavy fluid is pumped.

As an example, a method can include pumping heavy fluid (e.g., cement) down an annulus from a point above a liner hanger and a liner top packer. In such an example, stress on a formation may be reduced when compared to a method that pumps heavy fluid (e.g., cement) up such an annulus. For example, stress may be reduced as back pressure developed during pumping may be contained in between a casing and a landing string.

As an example, a method can include a liner hanger setting procedure. Such a procedure may include positioning a liner shoe at a depth at which a hanger is to be set, dropping a setting ball from a ball dropping sub of a cementing manifold, gravitating or pumping the ball down to a ball catch landing collar (e.g., at about a maximum rate of approximately 1 to 3 barrels per minute or as otherwise recommended), reducing the pump rate when the ball is expected to seat, increasing pressure (e.g., up to about 200 psi over setting pressure of the liner hanger), which pressure may act through setting ports of a hanger body and set slips on to a casing (e.g., noting that hanger shear may not indicate on surface gauges), and while holding the hanger setting pressure, setting the liner hanger by slacking off the liner weight on the hanger slips (e.g., plus about 10,000 to about 20,000 lbs of drill pipe weight), where a loss of weight may be indicated on a weight gauge as the liner hanger sets.

As an example, a method can include releasing a running tool. For example, such a method can include preparing a running tool for release once liner hanger is set, slacking off (e.g., about 10,000 to about 20,000 lbs) on the running tool (e.g., to ensure it is in compression), pressuring up (e.g., to about 200 psi over a running tool release pressure), ensuring slack off weight compensates for hydraulic forces that may be pushing the running string up, bleeding the pressure and picking up the string to check for release (e.g., where liner string weight will be lost when setting tool is released), when the liner weight has been lost and the tool is released, setting back down onto the top of the liner (e.g., slacking off about 10,000 to 15,000 lbs), and shearing the ball seat to increase pressure up to a shear value (e.g., as may be indicated on an inspection sheet) where a pressure drop will indicate successful shear and allow circulation to resume. Such a method may further include initiating liner rotation (e.g., in compression) and circulation, for example, if the hanger is equipped with bearings (e.g., with a torque limit that is not to exceed torque of a weakest connection).

As an example, a method can include cementing a liner. For example, such a method may include rigging up cementing equipment and pressure testing one or more steel lines (e.g., to a specified pressure), circulating a hole volume to condition mud (e.g., or as otherwise specified) and releasing a drill pipe dart from a cement head and pumping cement behind the dart. In such an approach, the dart may be translated along a longitudinal axis to an axial location, which may be defined by and/or with respect to a shifting sleeve. For example, a shifting sleeve may include a dart seat that can seat a portion of the dart (e.g., a dart head, etc.). Once seated, the dart and shifting sleeve as an assembly may be translated.

As an example, a method can include reducing a pump rate of cement, for example, to a rate of approximately a barrel per minute or less prior to a pump down plug latching into a shifting sleeve of a fluid crossover assembly. As an example, a method can include pressuring up against a drill pipe dart, for example, to set a reverse cement assembly (RCA) between a casing and a landing string. For example, a reverse cement assembly may include a shifting sleeve that can translate axially with respect to a ported component (e.g., a ported sleeve). As an example, the ported component can include radial and axial ports where radial ports can direct cement radially outwardly to an annulus and where axial ports can direct cement axially upwardly, for example, after the cement has flowed through the annulus. As an example, the drill pipe dart may be a part of the reverse cementing assembly (RCA).

As an example, a method can include applying pressure to a drill pipe dart to transfer pressure to a shifting sleeve in which the drill pipe dart is seated. Such pressure may cause the shifting sleeve to translate axially with respect to a ported component and orient a reverse cementing assembly (RCA) in an open position where cement may flow from a bore of the shifting sleeve radially outwardly through radial openings in the ported component to an annulus. In such an example, the annulus may be a casing/liner annulus that is defined by an inner surface of a casing and an outer surface of a liner (e.g., which may be cylindrical structures). As an example, a method can include applying pressure to a drill pipe dart and shearing a shifting sleeve to reveal a number of ports of a ported component that provide access to an annulus defined at least in part by a casing and a liner.

As an example, a method can include pumping a displacement volume of cement (e.g., as may be predetermined, calculated, etc.) that is to be routed down a casing/liner annulus where one or more return paths are defined, for example, with returns being taken back through a liner shoe and a landing string bore. As an example, a liner may be rotated within torque limits of a system during at least a portion of a cementing process. As an example, a method can include reducing a cement pump rate when nearing an end of a displacement volume.

As an example, a method can include, once a desired displacement of cement has been achieved, releasing and translating a second drill pipe dart, which may, for example, follow behind a cement column and latch in to (e.g., or on to) a shifting sleeve, for example, above flow ports of the shifting sleeve. In such an example, the method may include applying pressure that can cause the shifting sleeve to shift to a closed position (e.g., that closes one or more flow paths through which cement has flown from a bore of the shifting sleeve, via radial openings, to radial openings of a ported component and to an annulus defined by a casing and a liner.

As an example, a method can include setting a liner top packer after performing a cementing process. For example, consider a method that includes raising a work string to release a reverse cement tool packer and pull the packer setting rotating dog assembly (RDA) out of a tie-back receptacle (TBR) and slacking off a specified work string weight to set the packer.

As an example, where a system is equipped with a retrievable cementing bushing (RCB), or a pack-off, a method may include testing a packer by applying an annular test pressure. In such an example, the pressure may be held and, for example, monitored for evidence of pressure loss where no leakage (e.g., no substantial pressure loss) may indicate a properly set packer. After performing such a test, a method may include releasing pressure (e.g., and recording data).

As an example, a method may include (e.g., optionally after a successful pressure test) picking up to raise a work string and release it from a cementing bushing and flapper valves in a liner. In such an example, flapper valves can close preventing flow back of cement in to the liner.

As an example, a method can include pressuring up and releasing darts from a shifting sleeve, which may be part of a reverse cementing assembly (RCA) and, for example, pumping to a bottom of a liner.

As an example, after pressure may be equalized around a cementing bushing (RCB), reverse circulation may be initiated. As an example, a method can include pulling a running string out of a hole, for example, without rotating while retrieving a running tool assembly. As an example, a method can include flushing setting tool surfaces, for example, on a rig floor. As an example, a method can include checking a running string and noting any visible signs of damage before shipping it to a shop.

Figure 3:
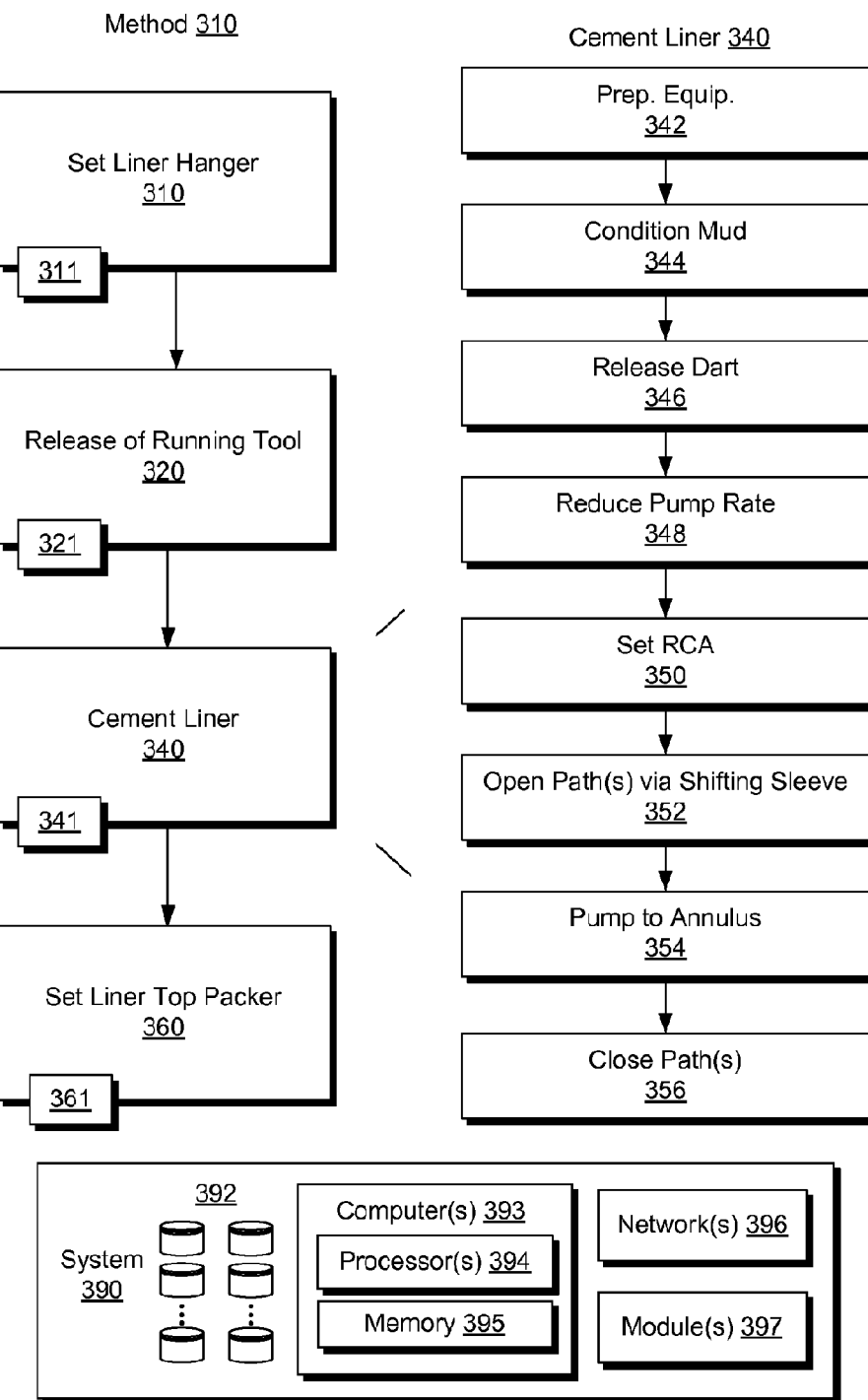
FIG. 3 illustrates an example of a method and an example of a system.

FIG. 3 shows an example of a method 310 that includes a set block 310 for setting a liner hanger, a release block 320 for releasing a running tool, a cement block 340 for cementing a liner and a set block 360 for setting a liner top packer.

As shown in FIG. 3, the cement block 340 can include, for example, a preparation block 342 for preparing equipment, a condition block 344 for conditioning mud, a release block 346 for releasing a dart, a reduction block 348 for reducing a cement pump rate, a set block 350 for setting a reverse cementing assembly (RCA), an open block 352 for opening one or more paths via a shifting sleeve (e.g., translating a shifting sleeve that may be part of a reverse cementing assembly) for flow of cement, a pump block 354 for pumping cement via the one or more openings to an annulus (e.g., defined at least in part by a surface of a liner), and a close block 356 for closing the one or more openings.

The method 310 is shown in FIG. 3 in association with various computer-readable media (CRM) blocks 311, 321, 341 and 361. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 310. As an example, a computer-readable medium (CRM) may be a computer-readable storage medium that is non-transitory and that is not a carrier wave.

FIG. 3 also shows an example of a system 390 includes one or more information storage devices 392, one or more computers 393, one or more networks 396 and one or more modules 397. As to the one or more computers 393, each computer may include one or more processors (e.g., or processing cores) 394 and memory 395 for storing instructions (e.g., modules), for example, executable by at least one of the one or more processors. As an example, a computer may include one or more network interfaces (e.g., wired or wireless), one or more graphics cards, a display interface (e.g., wired or wireless), etc.

As an example, the one or more modules 397 may include instructions (e.g., stored in memory) executable by one or more processors to instruct the system 390 to perform various actions. As an example, one or more methods, techniques, etc. may be performed at least in part using one or more modules, which may be, for example, one or more of the one or more modules 397 of FIG. 3. As an example, the blocks 311, 321, 341 and 361 may be modules.

As an example, the block 341 can include instructions to instruct a system to, for example, pump cement at a pressure to translate a device (e.g., a dart, a ball, etc.) into a bore of a shifting sleeve, pump cement at a pressure to seat the device against a stop of the shifting sleeve, and pump cement at a pressure to flow the cement from the bore of the shifting sleeve through radial passages of the shifting sleeve and to an annulus via radial passages of a ported component. In such an example, pressure may optionally be monitored (e.g., directly and/or indirectly), for example, to indicate when a device (e.g., a dart, a ball, etc.) may be received by a bore of a shifting sleeve, when a device (e.g., a dart, a ball, etc.) has been seated, when cement is flowing to an annulus, etc.

Figure 4:
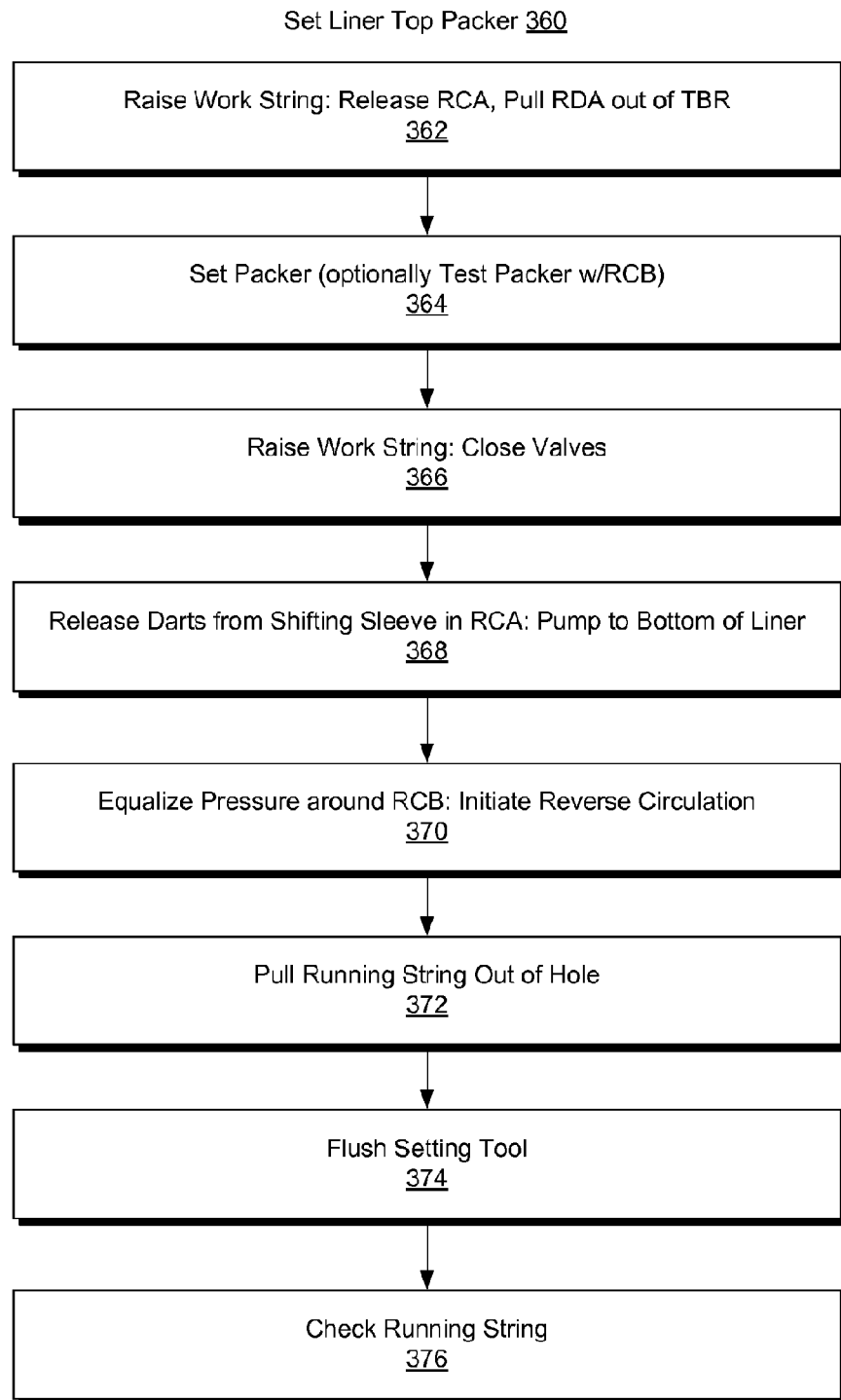
FIG. 4 illustrates an example of a method.

As shown in FIG. 4, the set block 360 of the method 310 may include a raise block 362 for raising a work string to release a reverse cement assembly (RCA) and for pulling a rotating dog assembly (RDA) out of a tie-back receptacle (TBR), a set block 364 for setting a packer, a raise block 366 for raising a work string (e.g., to close one or more valves), a release block 368 for releasing one or more darts from a shifting sleeve of a reverse cementing assembly (RCA) (e.g., via pumping) and pumping to a bottom of liner, an equalize block 370 for equalizing pressure around a retrievable cementing bushing (RCB), a pull block 372 for pulling a running string out of a hole, a flush block 374 for flushing a setting tool (e.g., cleaning a setting tool) and a check block 376 for checking running string (e.g., as to condition, etc.).

Figure 5:
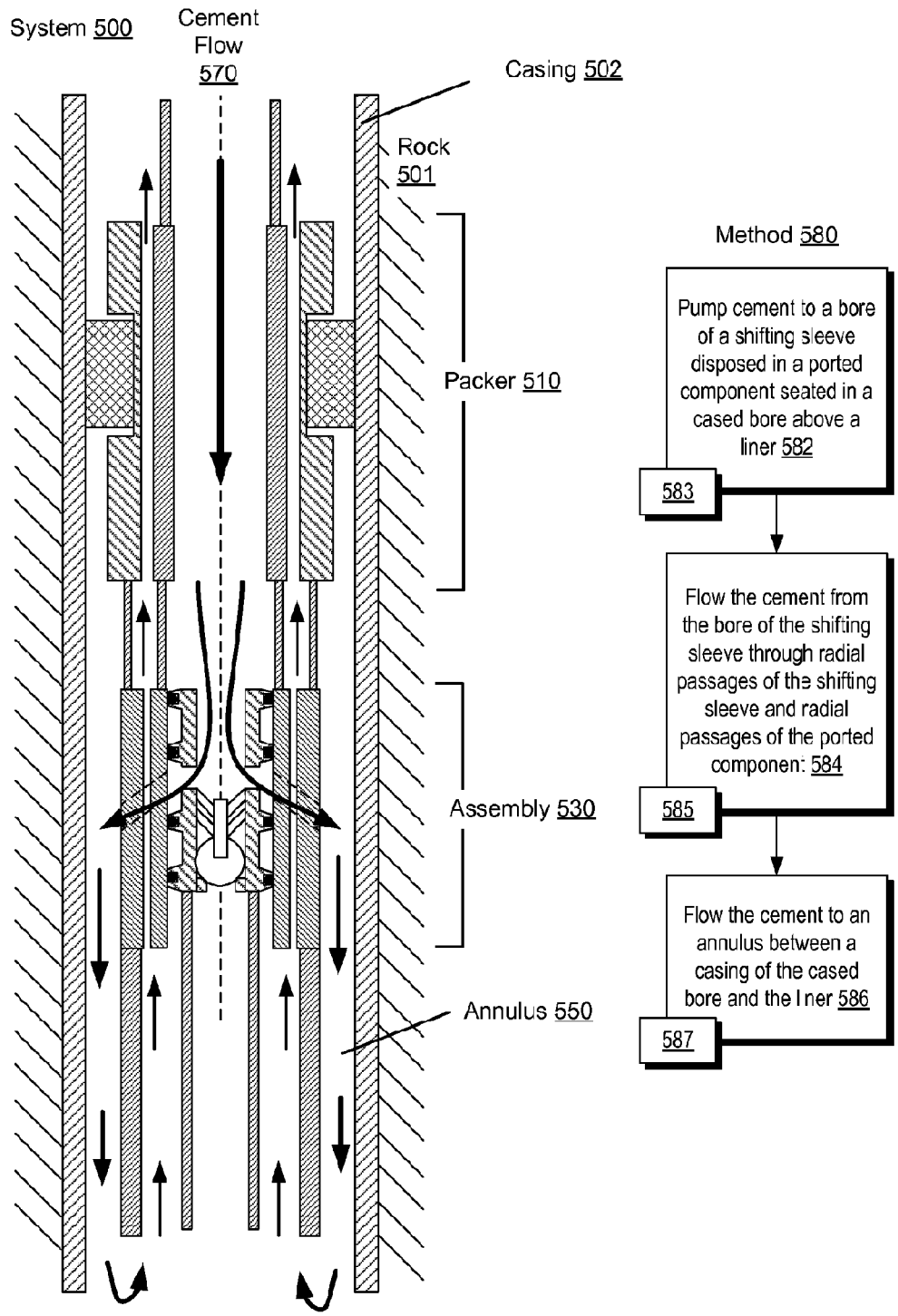
FIG. 5 illustrates an example of a system.

FIG. 5 shows an example of a system 500 and an example of a method 580. As shown, the system 500 is disposed at least in part in a bore in rock 501 where a casing 502 is placed in the bore adjacent to the rock 501. As shown, the system 500 can include a packer 510, an assembly 530 and an annulus 550. The assembly 530 is shown as including components that can be arranged to open and/or close paths to the annulus 550. As an example, cement flow 570 may be axially downwardly through a bore of the system 500 and into the assembly 530 where radial paths exist that may be opened to be in fluid communication with the annulus 550. In such an example, the cement flow 570 may enter the annulus 550. As shown, one or more return paths may exist that are directed axially upwardly, for example, via one or more axial paths of the assembly 530.

In the example of FIG. 5, the method 580 includes a pump block 582 for pumping cement to a bore of a shifting sleeve disposed in a ported component seated in a cased bore above a liner; a flow block 584 for flowing the cement from the bore of the shifting sleeve through radial passages of the shifting sleeve and radial passages of the ported component; and a flow block 586 for flowing the cement to an annulus between a casing of the cased bore and the liner. As an example, such a method can include flowing the cement from the annulus to axial passages of the ported component.

As an example, a method may include (e.g., prior to flowing cement from a bore of a shifting sleeve through radial passages of shifting sleeve and radial passages of a ported component), translating a dart to a bore of a shifting sleeve. Such a method may include seating the dart against a stop of the shifting sleeve and, for example, translating the shifting sleeve with the dart seated against the stop to fluidly couple radial passages of the shifting sleeve and radial passages of the ported component. As an example, a ball or other translatable device may be implemented as part of a system (e.g., or assembly). As an example, such a device may be translatable via flow, gravity, etc. to a position within a shifting sleeve.

As an example, a method may include translating a dart (e.g., or other device) to a shifting sleeve to close a bore of the shifting sleeve. As an example, a method may include translating a shifting sleeve to fluidly decouple radial passages of the shifting sleeve and radial passages of a ported component.

The method 580 is shown in FIG. 5 in association with various computer-readable media (CRM) blocks 583, 585, and 587. Such blocks generally include instructions suitable for execution by one or more processors (or processor cores) to instruct a computing device or system to perform one or more actions (see, e.g., the system 390 of FIG. 3). While various blocks are shown, a single medium may be configured with instructions to allow for, at least in part, performance of various actions of the method 580. As an example, a computer-readable medium (CRM) may be a computer-readable storage medium that is non-transitory and that is not a carrier wave.

Figure 6:
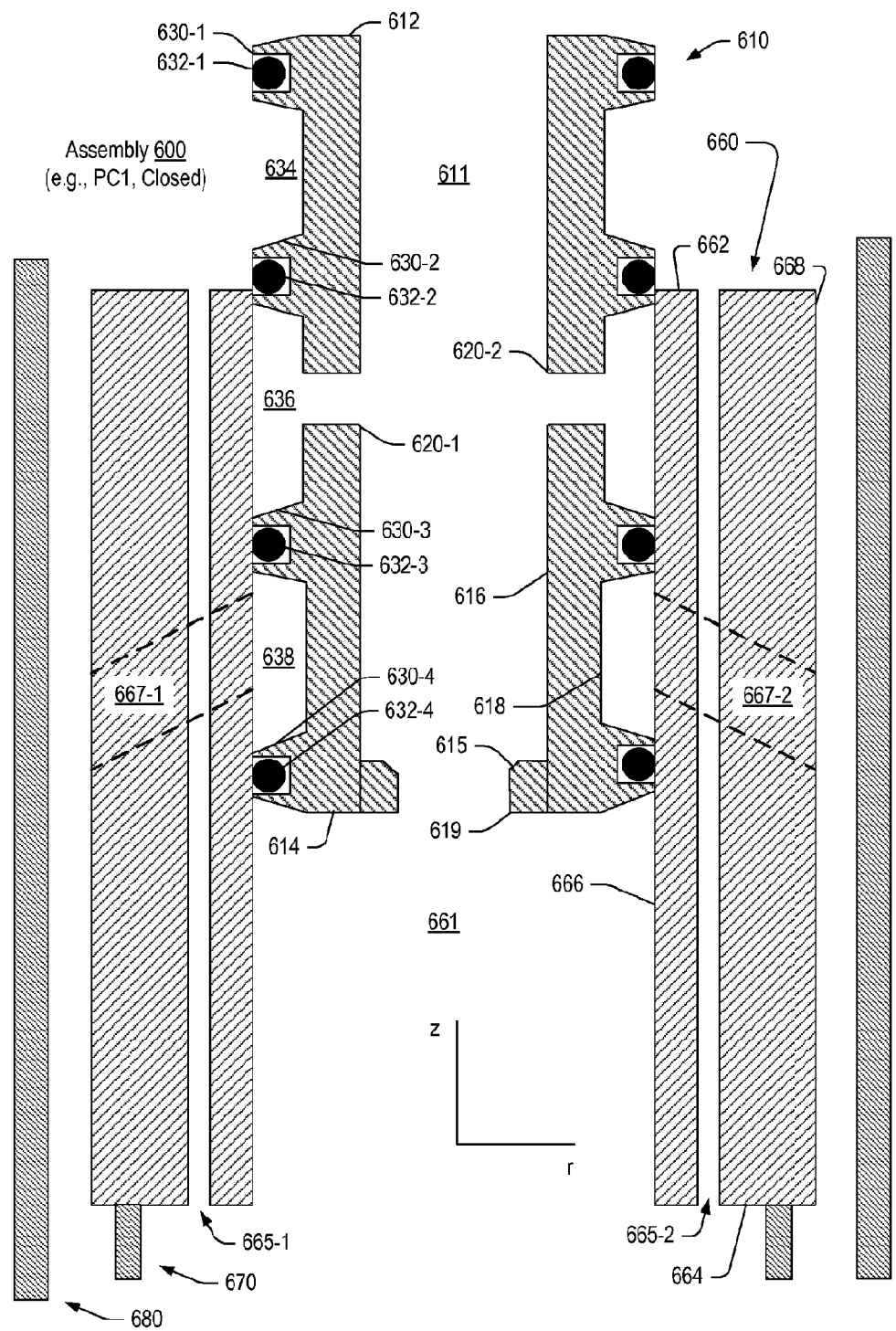
FIG. 6 illustrates an example of an assembly.
Figure 7:
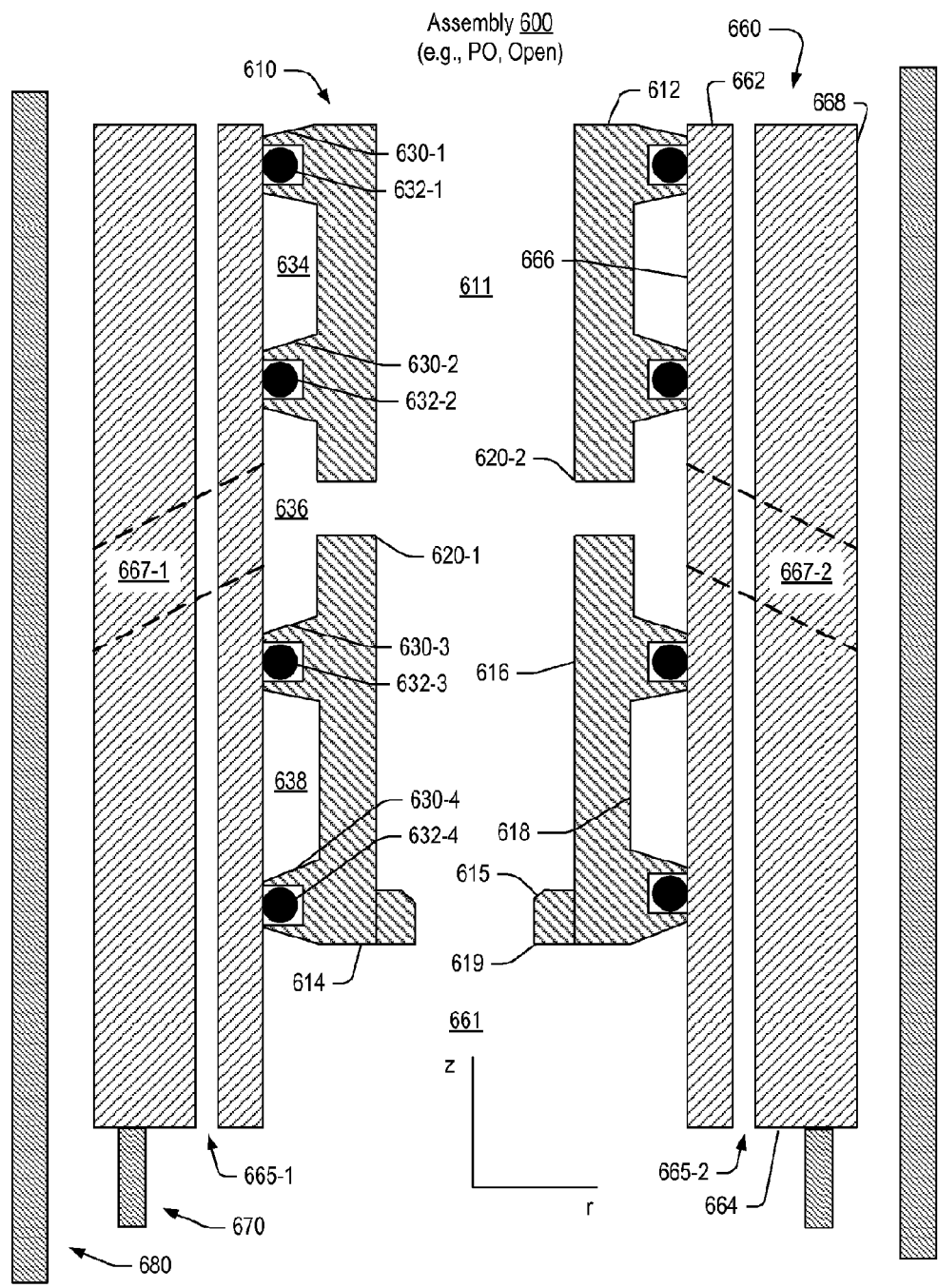
FIG. 7 illustrates an example of the assembly of FIG. 6.
Figure 8:
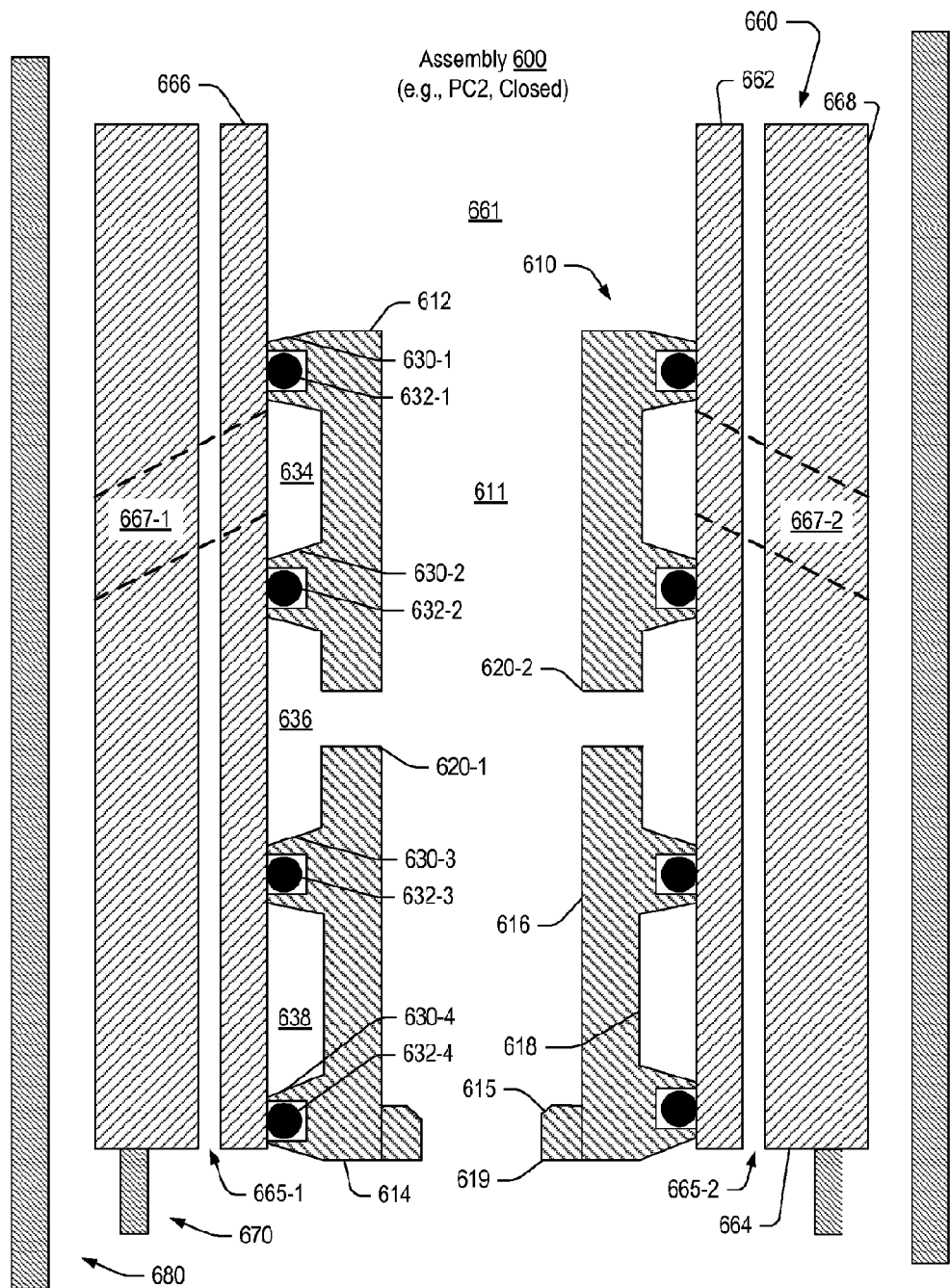
FIG. 8 illustrates an example of the assembly of FIG. 6.

FIGS. 6, 7 and 8 show an example of an assembly 600 that includes a shifting sleeve 610 and a ported component 660. In the example of FIG. 6, the shifting sleeve 610 is in a first closed position with respect to the ported component 660 (e.g., PC1). In the example of FIG. 7, the shifting sleeve 610 is in an open position with respect to the ported component 660 (e.g., PO). In the example of FIG. 8, the shifting sleeve 610 is in a second closed position with respect to the ported component 660 (e.g., PC2). In the example of FIG. 6, the assembly 600 is shown along with a liner 670 and a casing 680 that define an annulus.

As shown, the shifting sleeve 610 can include a bore 611, a top end 612, a bottom end 614, a stop 615, an inner surface 616 (e.g., that may at least in part define the bore 611 of the shifting sleeve 610), an outer surface 618 and a bottom opening 619 (e.g., which, if unblocked, may allow for flow through the bore 611 of the shifting sleeve 610). In the example of FIG. 6, the shifting sleeve 610 includes a plurality of openings or passages 620-1 and 620-2. The shifting sleeve 610 also includes seal bosses 630-1, 630-2, 630-3 and 630-4 that are disposed at different axial positions (see, e.g., z-axis). As shown, each of the seal bosses 630-1, 630-2, 630-3 and 630-4 can receive a respective seal element 632-1, 632-2, 632-3 and 632-4. As shown, regions 634, 636 and 638 may be defined (e.g., annular regions) at least in part by the seal bosses 630-1, 630-2, 630-3 and 630-4. Such are shown as extending axially between adjacent seal bosses. As an example, seal bosses and respective seal elements of a shifting sleeve may define at least one seal region (e.g., that can form a closed chamber) and at least one open region (e.g., for fluid communication from that region to another region). For example, the seal bosses 630-1, 630-2, 630-3 and 630-4 and respective seal elements 632-1, 632-2, 632-3 and 632-4 defined seal regions 634 and 638 and an open region 636.

In the example of FIG. 6, the ported component 660 includes a bore 661, a top end 662, a bottom end 664, an inner surface 666 (e.g., that may at least in part define the bore 661 of the ported component 660), and an outer surface 668. As shown, the ported component 660 can include axial openings or passages 665-1 and 665-2 and radial openings or passages 667-1 and 667-2. As an example, an opening or a passage may be referred to as a port, for example, a port through which cement (e.g., a heavy fluid) may flow.

In the example of FIG. 6, the assembly 600 may be a reverse cementing assembly (RCA). As shown in FIG. 6, the shifting sleeve 610 is in a closed orientation with respect to the ported component 660 as the region 638 is axially aligned with a region of the ported component 660 that includes the passages 667-1 and 667-2.

FIG. 7 shows the shifting sleeve 610 in a different position with respect to the passages 667-1 and 667-2 of the ported component 660, which is an open position as the region 636 is axially aligned with the region of the ported component 660 that includes the passages 667-1 and 667-2. As shown, the region 636 is in fluid communication with the bore 611 of the shifting sleeve 610 via the openings 620-1 and 620-2.

FIG. 8 shows the shifting sleeve 610 in a different position with respect to the passages 667-1 and 667-2 of the ported component 660, which is a closed position as the region 634 is axially aligned with the region of the ported component 660 that includes the passages 667-1 and 667-2.

Figure 9:
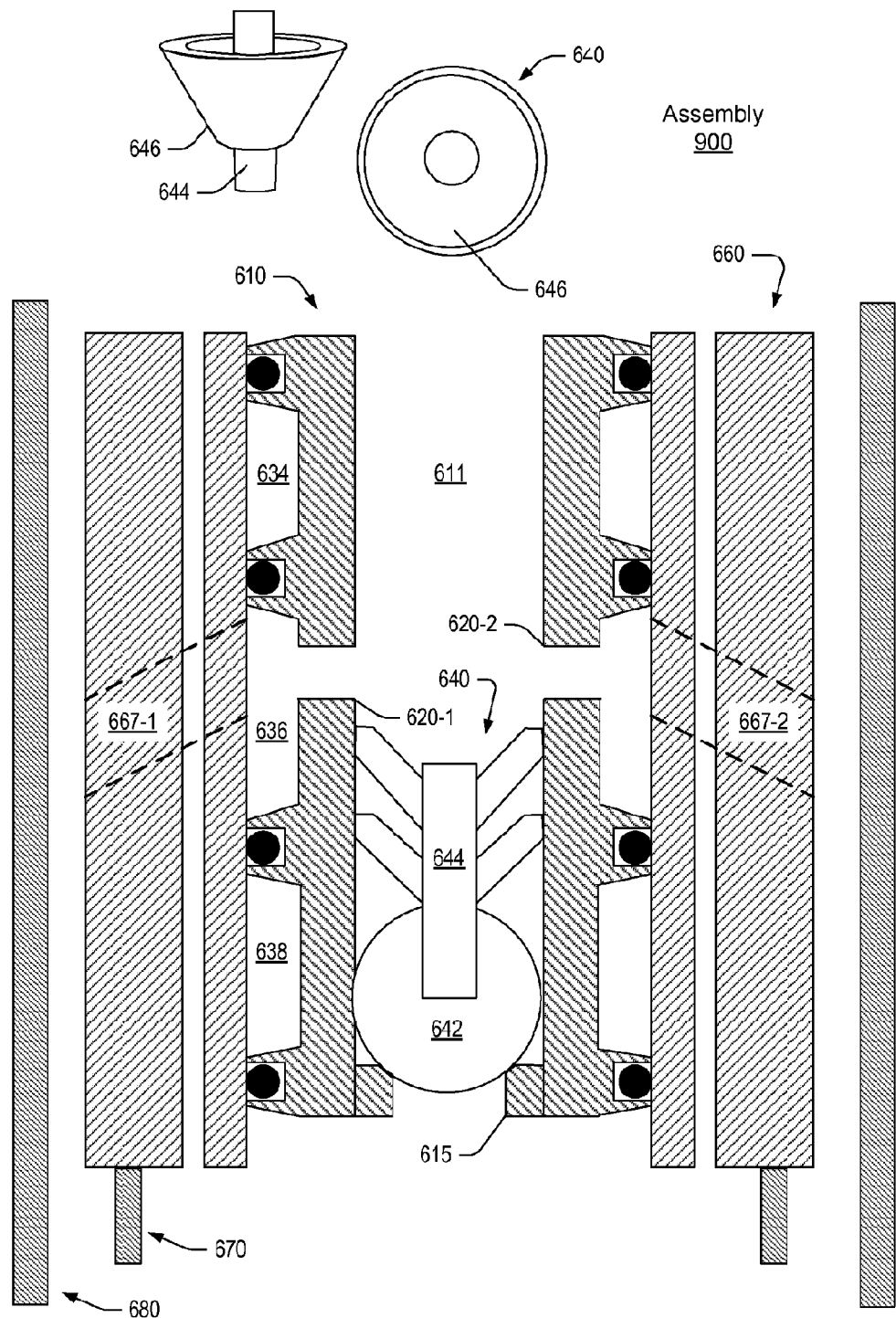
FIG. 9 illustrates an example of an assembly.

FIG. 9 shows an example of an assembly 900 that includes the assembly 600 of FIGS. 6, 7 and 8 (e.g., in the open position of FIG. 7) and an example of a dart 640. As shown, the dart 640 can include a head 642, a shaft 644 and guides 646 that extend radially outwardly from the shaft 644. As an example, a guide may include a conical shape, for example, to "catch" material that can propel a dart downwardly. In such an example, a diameter of a guide may act to maintain a dart in a relatively axial orientation with respect to a surface that defines a bore through which the dart may travel. FIG. 9 shows a perspective view of one of the guides 646, which may include a conical shape through which the shaft 644 extends. As an example, a shaft may be a multi-piece shaft (e.g., components that may be coupled together, optionally via one or more guide components, etc.). As an example, a dart may include one or more features of a pumpdown plug (PDP). As an example, a shifting sleeve may include one or more features of a liner wiper plug (LWP), for example, one or more features that may be configured to receive and/or seat a PDP. As mentioned, a ball or other device may be implemented as part of an assembly or as part of a system. For example, consider a ball with a shape akin to that of the head 642 of the dart 640 of FIG. 9.

As an example, the dart 640 may enter a bore of the shifting sleeve 610 and proceed axially downwardly to seat against the stop 615 of the shifting sleeve 610. In such an example, an end of the dart 640 may be axially below the openings 620-1 and 620-2 of the shifting sleeve 610. As an example, the dart 640 may act to "seal" off the opening 619 at the bottom end 614 of the shifting sleeve 610, which may prevent flow of cement through the opening 619. In such an example, pressure may cause the shifting sleeve 610 to translate axially with respect to the ported component 660 and to cause the openings 620-1 and 620-2 and the region 634 to align substantially with the openings 667-1 and 667-2 of the ported component 660. In such an opened orientation, cement may flow from the interior of the shifting sleeve 610 to an annular region defined by the outer surface 668 of the ported component 660 and, for example, an inner surface of the casing 680. Such cement may flow axially downwardly to an annulus defined by the liner 670 and the casing 680.

As an example, a dart may include a ball portion that can seat in a ball seat of a shifting sleeve. For example, the head 642 of the dart 640 may be a ball (e.g., hemisphere, etc.) and the stop 615 of the shifting sleeve 610 may be a ball seat (e.g., a conical surface, a segment of a sphere, etc.). As an example, a seat may be expandable. As an example, a nose on a dart may include a ratchet feature, for example, that can perform one or more ratcheting operations (e.g., associated with seating, sealing, etc.).

Figure 10:
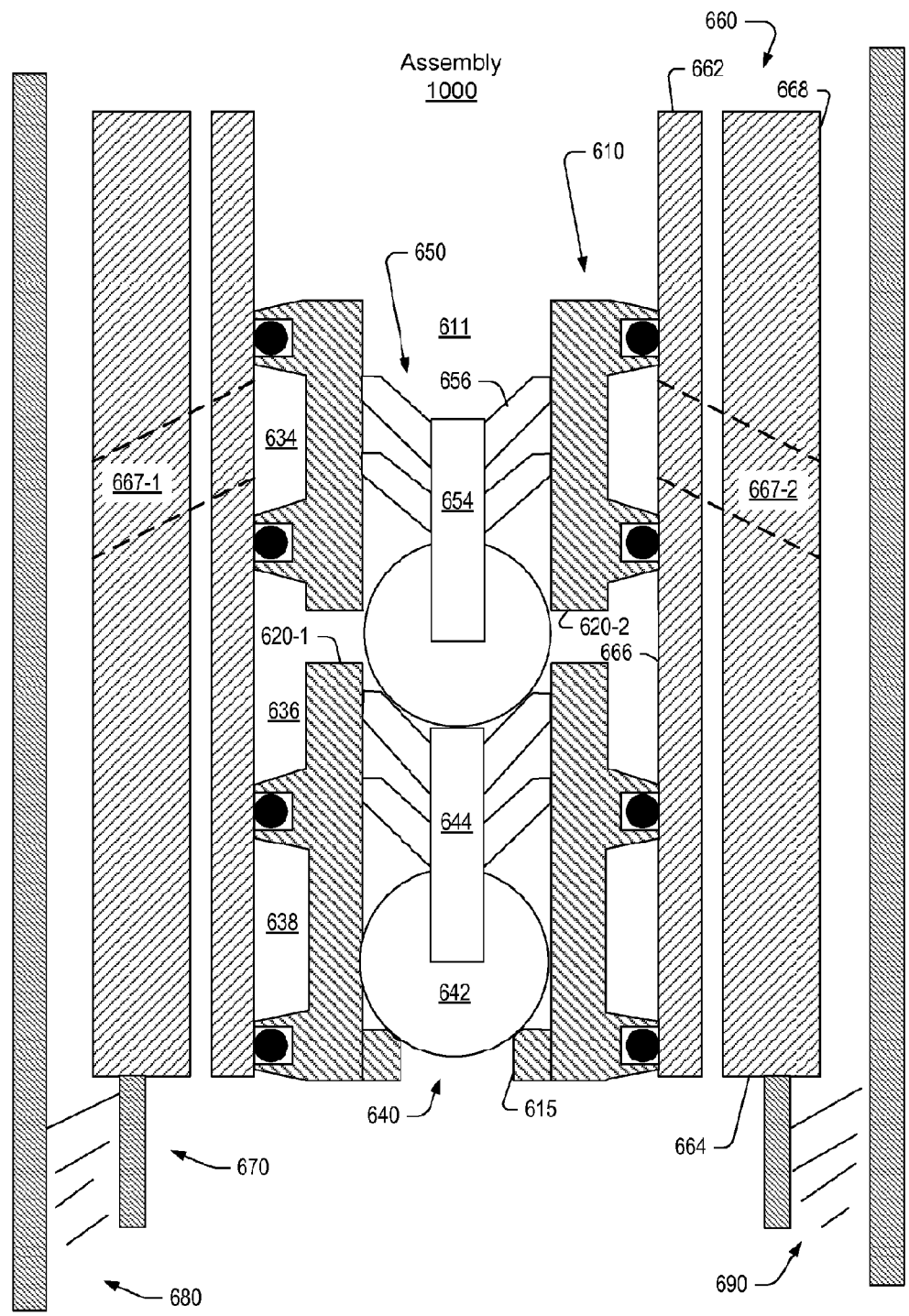
FIG. 10 illustrates an example of an assembly.

FIG. 10 shows an example of an assembly 1000 that includes the assembly 900 of FIG. 9 and an example of another dart 650 as well as an example of cement 690 disposed in an annular region defined by the liner 670 and the casing 680. As shown, the dart 650 can include a head 652, a shaft 654 and guides 656. In the example of FIG. 10, the dart 650 is received by the bore 611 of the shifting sleeve 610 axially above the dart 640. In such an example, applied force may cause the shifting sleeve 610 to translate axially downwardly with respect to the ported component 660 such that the second closed position (see, e.g., FIG. 8) may be achieved. For example, as shown in FIG. 10, the region 634 is axially aligned with the passages 667-1 and 667-2 of the ported component 660 and the region 636 is axially in a region for which the ported component 660 does not include radial passages that can fluidly couple the region 636 with a region exterior to the outer surface 668 of the ported component 660. As an example, the dart 650 may optionally be shaped and/or sized to seal off the bore 611 of the shifting sleeve 610. In such an example, flow of cement therethrough is hindered, for example, the assembly 600 may be considered to be in a closed orientation via operation of the dart 650. As an example, a ball or other device may be implemented to perform one or more functions such as one or more functions of the dart 650. For example, a ball may be translated axially and at least in part received via the bore 611 of the shifting sleeve 610.

As an example, the dart 650 may land on the dart 640. For example, the head 652 of the dart 650 may contact the dart 640 (e.g., along its shaft 644, etc.). As an example, a shifting sleeve may include one or more expandable seats. For example, an expandable seat may respond to force to be at least in part deformable (e.g., when contacted by a device such as a dart, a ball, etc.).

As an example, a method may include axially translating via force the shifting sleeve 610 downwardly to thereby close off the openings 667-1 and 667-2 of the ported component 660. As an example, where the shifting sleeve 610 has already received a device (e.g., a dart, a ball, etc.), another device may be at least in part received by the shifting sleeve 610 to cause the shifting sleeve 610 to translate axially to a closed orientation with respect to the ported component 660 (see, e.g., the second closed position PC2 of FIG. 8).

FIG. 9 shows an example of a ported component 960. In the example of FIG. 9, the ported component 960 includes a top end 962, a bottom end 964, an inner surface 966 and an outer surface 968. As shown, the ported component 960 can include axial openings or passages 965-1 and 965-2 and radial opening or passages 967-1 and 967-2. As an example, an opening or a passage may be referred to as a port, for example, a port through which cement (e.g., a heavy fluid) may flow.

Figure 11:
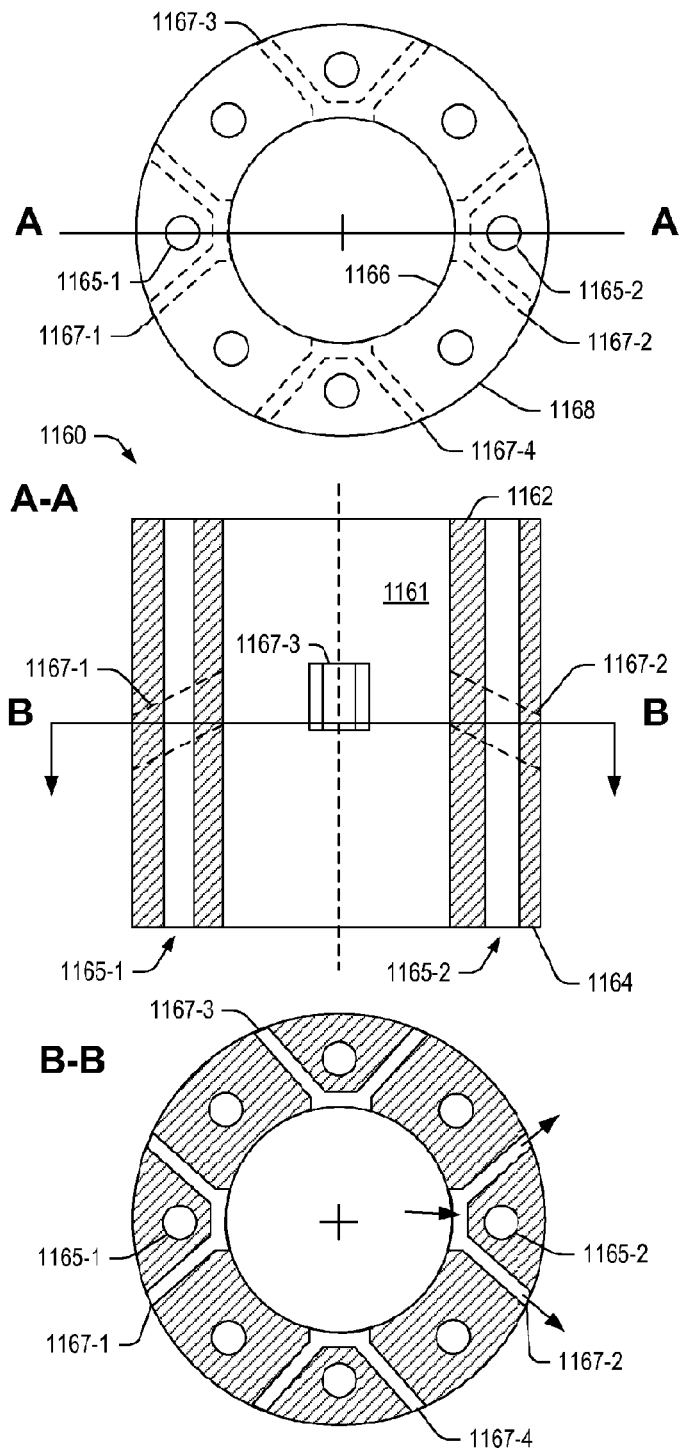
FIG. 11 illustrates an example of a ported component.

FIG. 11 shows an example of a ported component 1160. In the example of FIG. 11, the ported component 1160 includes a bore 1161, a top end 1162, a bottom end 1164, an inner surface 1166 and an outer surface 1168. As shown, the ported component 1160 can include axial openings or passages 1165-1 and 1165-2 and radial opening or passages 1167-1, 1167-2, 1167-3 and 1167-4. As an example, an opening or a passage may be referred to as a port, for example, a port through which cement (e.g., a heavy fluid) may flow.

Figure 12:
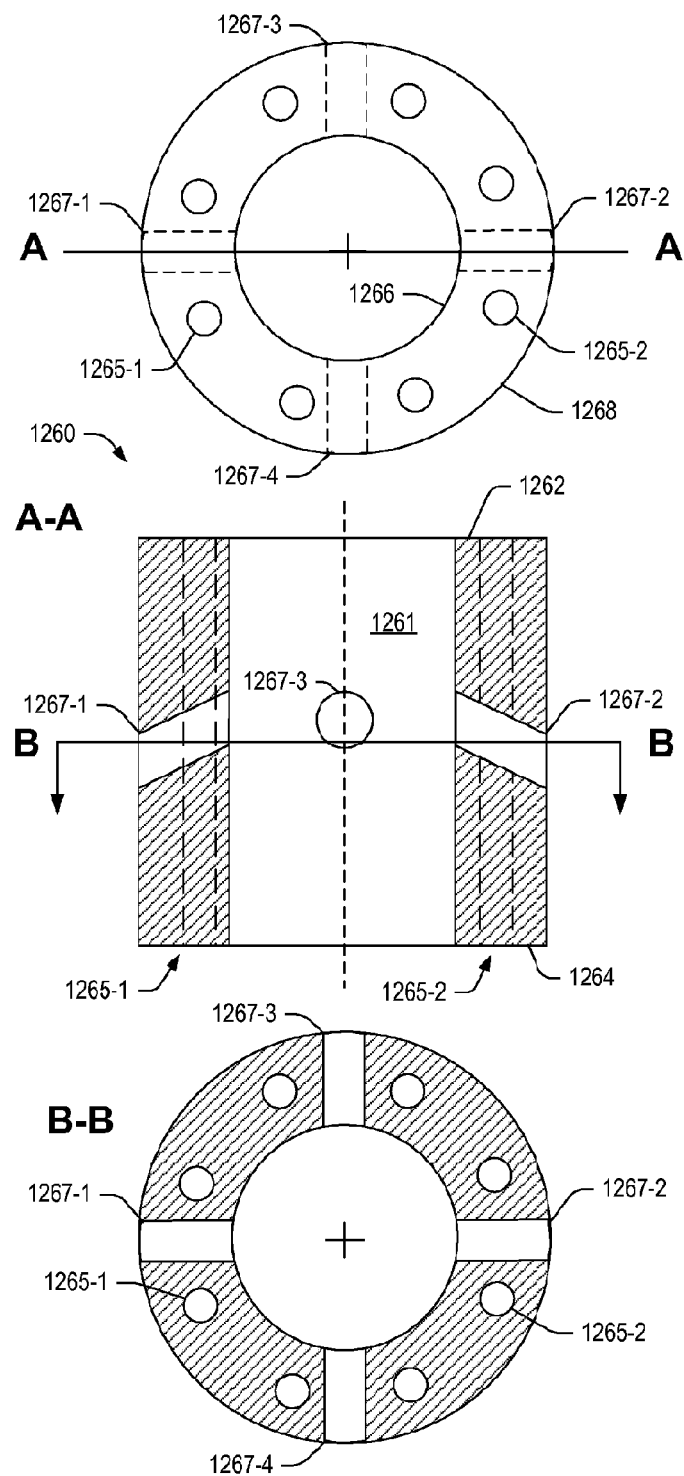
FIG. 12 illustrates an example of a ported component.

FIG. 12 shows an example of a ported component 1260. In the example of FIG. 12, the ported component 1260 includes a bore 1261, a top end 1262, a bottom end 1264, an inner surface 1266 and an outer surface 1268. As shown, the ported component 1260 can include axial openings or passages 1265-1 and 1265-2 and radial opening or passages 1267-1, 1267-2, 1267-3 and 1267-4. As an example, an opening or a passage may be referred to as a port, for example, a port through which cement (e.g., a heavy fluid) may flow.

Figure 13:
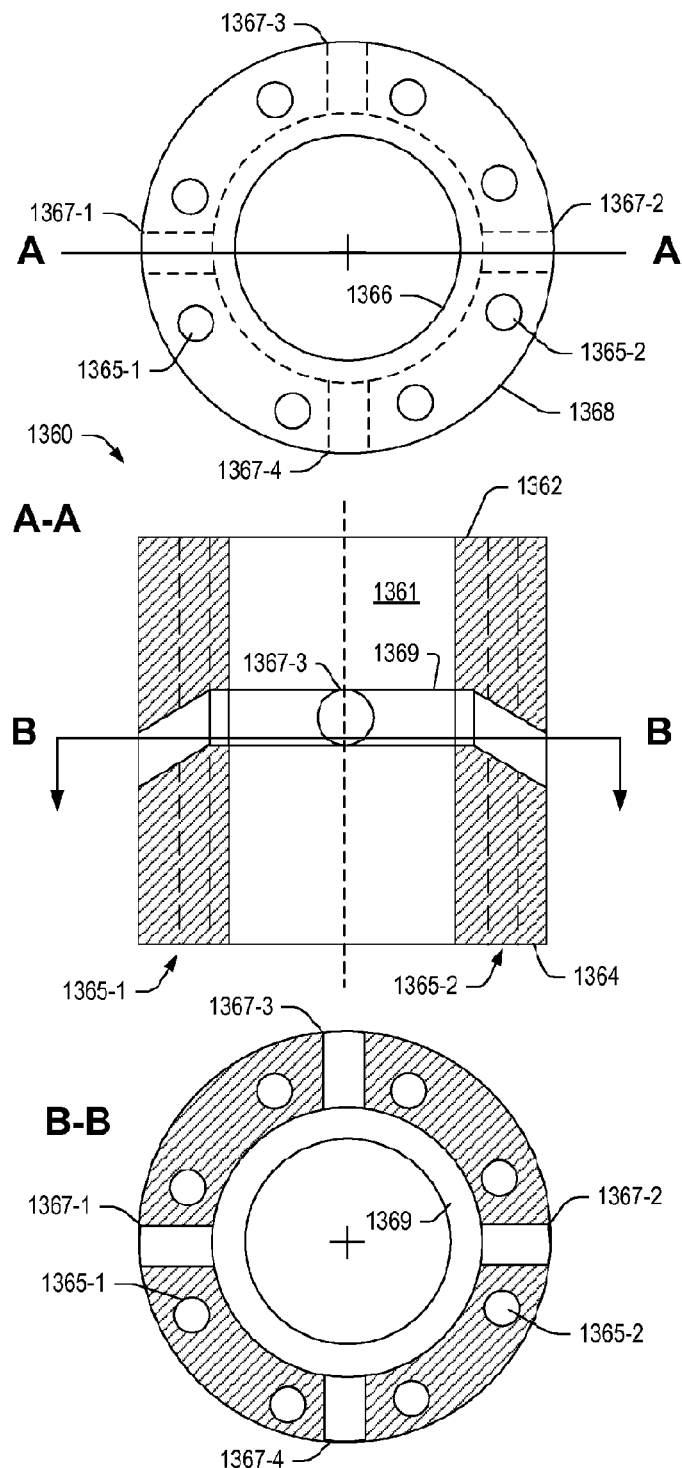
FIG. 13 illustrates an example of a ported component.

FIG. 13 shows an example of a ported component 1360. In the example of FIG. 13, the ported component 1360 includes a bore 1361, a top end 1362, a bottom end 1364, an inner surface 1366 and an outer surface 1368. As shown, the ported component 1360 can include axial openings or passages 1365-1 and 1365-2 and radial opening or passages 1367-1, 1367-2, 1367-3 and 1367-4 that may join a header region 1369 (e.g., an annular region). As an example, an opening or a passage may be referred to as a port, for example, a port through which cement (e.g., a heavy fluid) may flow.

Figure 14:
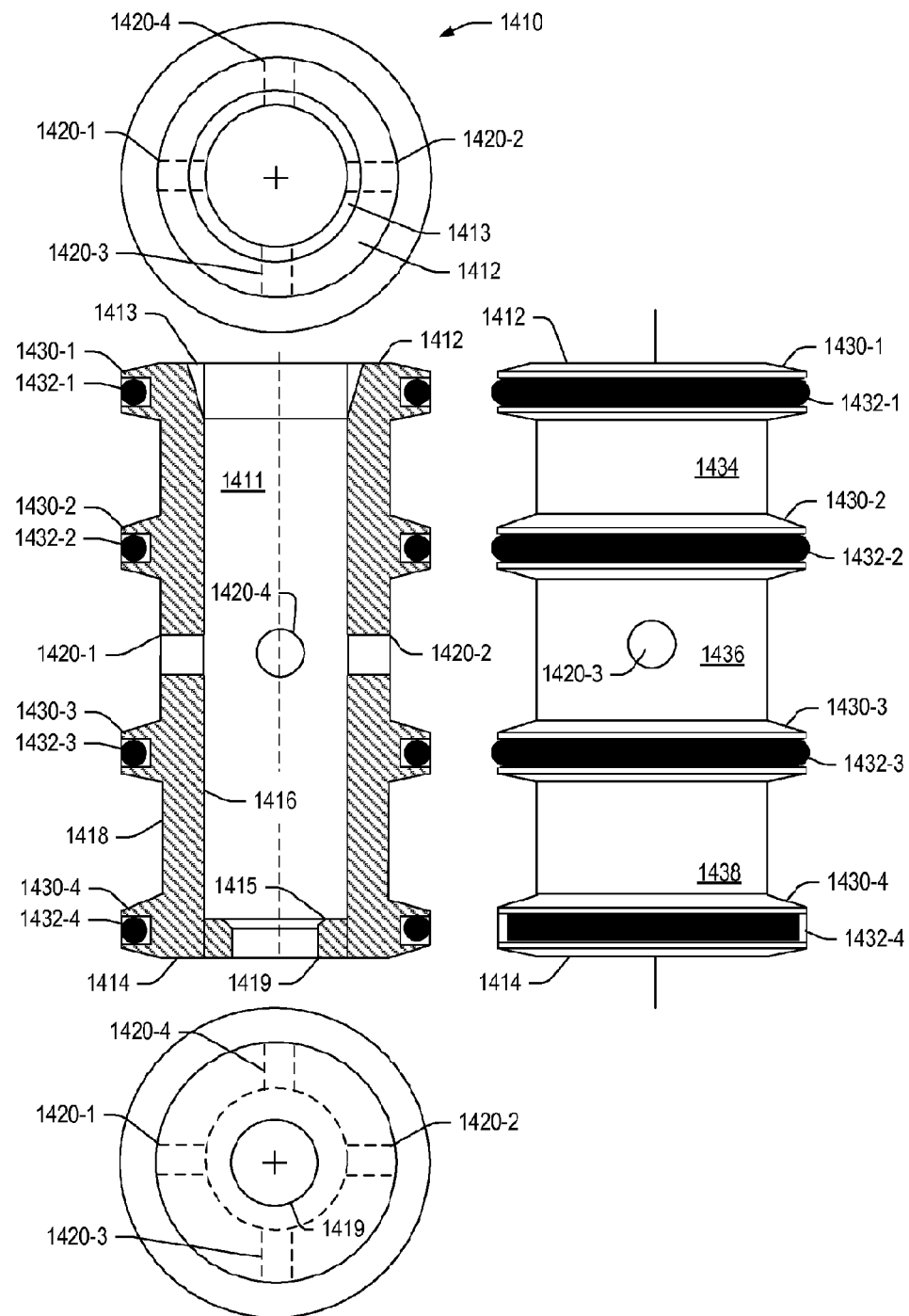
FIG. 14 illustrates an example of a shifting sleeve.

FIG. 14 shows an example of a shifting sleeve 1410. As shown, the shifting sleeve 1410 can include a bore 1411, a top end 1412, an optional guide 1413, a bottom end 1414, a stop 1415, an inner surface 1416, an outer surface 1418 and a bottom opening 1419. In the example of FIG. 14, the shifting sleeve 1410 includes a plurality of openings or passages 1420-1, 1420-2, 1420-3 and 1420-4. The shifting sleeve 1410 also includes seal bosses 1430-1, 1430-2, 1430-3 and 1430-4 that are disposed at different axial positions. As shown, each of the seal bosses 1430-1, 1430-2, 1430-3 and 1430-4 can receive a respective seal element 1432-1, 1432-2, 1432-3 and 1432-4 (e.g., at least in part in an annular groove of a seal boss, etc.). As shown, regions 1434, 1436 and 1438 may be defined (e.g., annular regions) at least in part by the seal bosses 1430-1, 1430-2. 1430-3 and 1430-4.

As an example, an assembly can include a ported component that includes a bore, radial passages and axial passages; and a shifting sleeve that includes a bore, radial passages, seal bosses and associated seal elements that define at least one sealed region with respect to the radial passages of the ported component and that define an open region with respect to the radial passages of ported component.

As an example, a shifting sleeve may include at least four seal bosses. As an example, radial passages of such a shifting sleeve can be disposed axially between axial locations of a pair of seal bosses.

As an example, a shifting sleeve can include a stop. As an example, such a stop may be located proximate to a distal end of the shifting sleeve and radial passages may be located proximate to a proximal end of the shifting sleeve.

As an example, an assembly may include a shifting sleeve, a ported component and a dart. As an example, a dart may include a head, a shaft and at least one guide. As an example, a dart can include a diameter that is less than a diameter of a bore of a shifting sleeve (e.g., such that the dart may be received by the bore of the shifting sleeve).

As an example, one or more methods described herein may include associated computer-readable storage media (CRM) blocks. Such blocks can include instructions suitable for execution by one or more processors (or cores) to instruct a computing device or system to perform one or more actions. As an example, equipment may include a processor (e.g., a microcontroller, etc.) and memory as a storage device for storing processor-executable instructions. In such an example, execution of the instructions may, in part, cause the equipment to perform one or more actions (e.g., consider the equipment 120 and the controller 122 of FIG. 1). As an example, a computer-readable storage medium may be non-transitory and not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

As an example, a system can include a processor; memory accessible by the processor; one or more modules stored in the memory that include processor-executable instructions where the instructions include instructions to pump cement at a pressure to translate a device into a bore of a shifting sleeve; pump cement at a pressure to seat the device against a stop of the shifting sleeve; and pump cement at a pressure to flow the cement from the bore of the shifting sleeve through radial passages of the shifting sleeve and to an annulus via radial passages of a ported component. In such a system, the pressure to flow the cement from the bore of the shifting sleeve through radial passages of the shifting sleeve and to an annulus via radial passages of a ported component may differ from the pressure to translate a device into a bore of a shifting sleeve; the pressure to flow the cement from the bore of the shifting sleeve through radial passages of the shifting sleeve and to an annulus via radial passages of a ported component may differ from the pressure to seat the device against a stop of the shifting sleeve; and/or the pressure to translate a device into a bore of a shifting sleeve may differ from the pressure to seat the device against a stop of the shifting sleeve. As an example, a system may include an interface and, for example, a pump operatively coupled to the interface (e.g., to control operation of the pump to achieve a desired pressure, flow rate, etc.). As an example, a system may include one or more modules that can instruction the system to perform one or more actions of a method such as, for example, the method 310 of FIG. 3. For example, a system may be implemented to perform various actions of the cement block 340 of the method 310 of FIG. 3 (e.g., releasing a device such as a dart, initiating pumping of cement, adjusting pumping of cement, terminating pumping of cement, etc.). As an example, a system may be implemented to cause a shifting sleeve to move from a closed position to an open position and/or from an open position to a closed position (see, e.g., the examples of FIGS. 6, 7 and 8). As an example, a system may be implemented to perform various actions of the set block 360 of the method 310 of FIG. 3, for example, as illustrated in FIG. 4 (e.g., raising equipment, pumping fluid, setting a packer, testing a packer, adjusting pressure, etc.).

Figure 15:
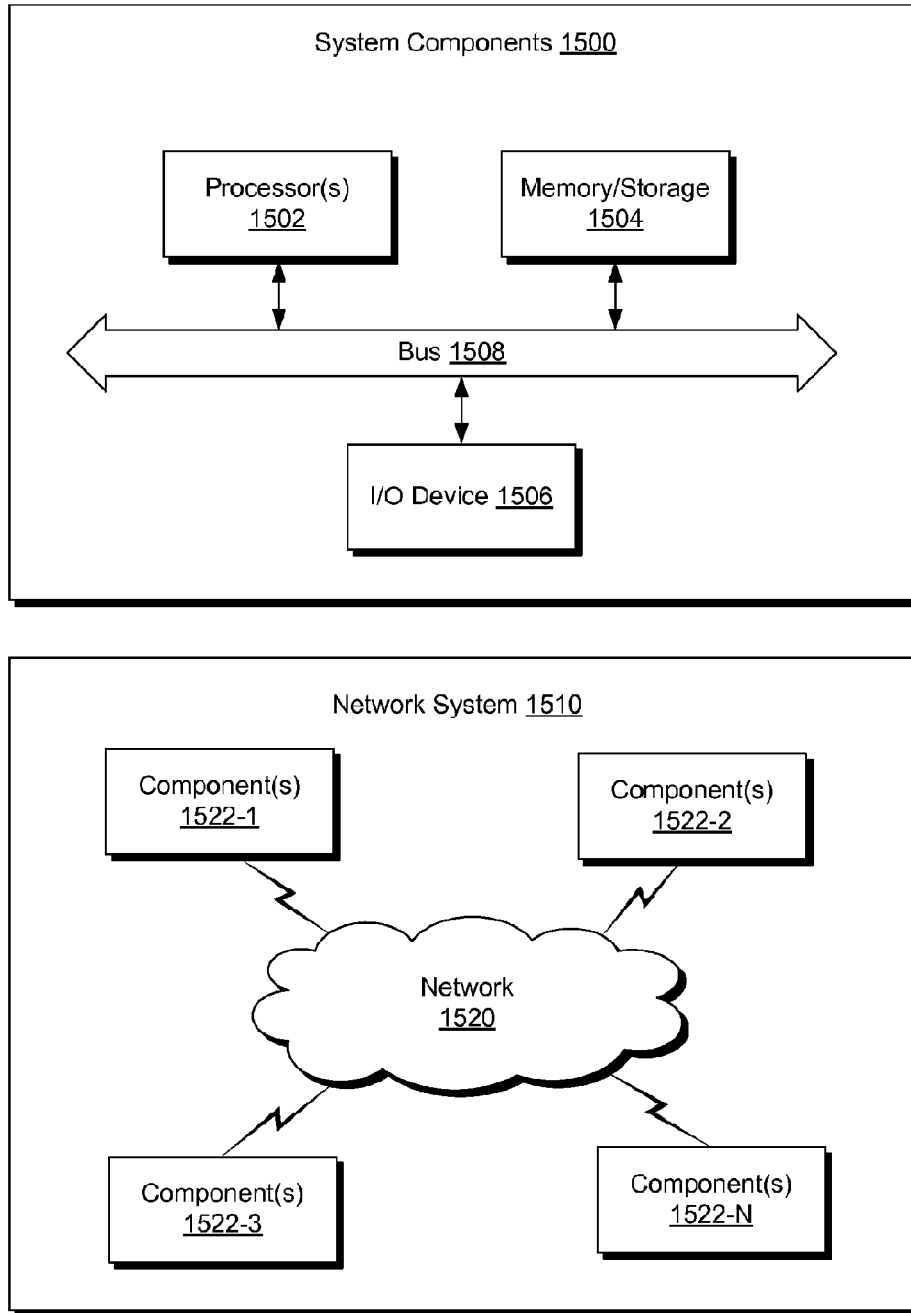
FIG. 15 illustrates example components of a system and a networked system.

FIG. 15 shows components of a computing system 1500 and a networked system 1510. The system 1500 includes one or more processors 1502, memory and/or storage components 1504, one or more input and/or output devices 1506 and a bus 1508. According to an embodiment, instructions may be stored in one or more computer-readable media (e.g., memory/storage components 1504). Such instructions may be read by one or more processors (e.g., the processor(s) 1502) via a communication bus (e.g., the bus 1508), which may be wired or wireless. As an example, instructions may be stored as one or more modules. As an example, one or more processors may execute instructions to implement (wholly or in part) one or more attributes (e.g., as part of a method). A user may view output from and interact with a process via an I/O device (e.g., the device 1506). According to an embodiment, a computer-readable medium may be a storage component such as a physical memory storage device, for example, a chip, a chip on a package, a memory card, etc.

According to an embodiment, components may be distributed, such as in the network system 1510. The network system 1510 includes components 1522-1, 1522-2, 1522-3, . . . 1522-N. For example, the components 1522-1 may include the processor(s) 1502 while the component(s) 1522-3 may include memory accessible by the processor(s) 1502. Further, the component(s) 1502-2 may include an I/O device for display and optionally interaction with a method. The network may be or include the Internet, an intranet, a cellular network, a satellite network, etc.

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    pumping cement to a bore of a shifting sleeve disposed in a ported component seated in a cased bore above a liner;
    flowing the cement from the bore of the shifting sleeve through radial passages of the shifting sleeve and radial passages of the ported component;
    flowing the cement to an annulus between a casing of the cased bore and the liner; and
    flowing the cement from the annulus to axial passages of the ported component.
2. The method of claim 1 further comprising, prior to flowing the cement from the bore of the shifting sleeve through the radial passages of the shifting sleeve and the radial passages of the ported component, translating a dart to the bore of the shifting sleeve.
3. The method of claim 2 further comprising seating the dart against a stop of the shifting sleeve.
4. The method of claim 3 further comprising translating the shifting sleeve with the dart seated against the stop to fluidly couple the radial passages of the shifting sleeve and the radial passages of the ported component.
5. The method of claim 3,
    wherein the stop of the shifting sleeve is a ball seat, and
    wherein the dart comprises a ball portion that seats in the ball seat of the shifting sleeve.
6. The method of claim 5, wherein the ball seat is expandable.
7. The method of claim 1 further comprising translating a dart to the shifting sleeve to close the bore of the shifting sleeve.
8. The method of claim 1 further comprising translating the shifting sleeve to decouple the radial passages of the shifting sleeve and the radial passages of the ported component.
9. A method comprising:
    pumping cement to a bore of a shifting sleeve disposed in a ported component seated in a cased bore above a liner;
    translating a first dart to the bore of the shifting sleeve;
    flowing the cement from the bore of the shifting sleeve through radial passages of the shifting sleeve and radial passages of the ported component;
    flowing the cement to an annulus between a casing of the cased bore and the liner;
    translating a second dart to the bore of the shifting sleeve axially above the first dart; and
    shifting the shifting sleeve to a closed position.
10. The method of claim 9 further comprising, prior to translating the second dart to latch into or on to the shifting sleeve, pumping a displacement volume of cement that is routed down the annulus between the casing and the liner until a desired displacement of cement is achieved.
11. The method of claim 9 further comprising flowing the cement from the annulus to axial passages of the ported component.
12. The method of claim 9 further comprising seating the first dart against a stop of the shifting sleeve.
13. The method of claim 12 further comprising translating the shifting sleeve with the first dart seated against the stop to fluidly couple the radial passages of the shifting sleeve and the radial passages of the ported component.
14. The method of claim 12,
    wherein the stop of the shifting sleeve is a ball seat, and
    wherein the dart comprises a ball portion that seats in the ball seat of the shifting sleeve.
15. The method of claim 14, wherein the ball seat is expandable.
16. The method of claim 9 further comprising translating the shifting sleeve to decouple the radial passages of the shifting sleeve and the radial passages of the ported component.
17. The method of claim 9, wherein the second dart is a ball.
18. The method of claim 9, wherein the second dart contacts the first dart in the bore of the shifting sleeve.
19. The method of claim 9, wherein the shifting sleeve comprises at least one expandable seat.

* * * * *